United States Patent
Yuan

(10) Patent No.: US 7,152,173 B2
(45) Date of Patent: *Dec. 19, 2006

(54) METHOD AND CONTROL APPARATUS FOR CONTROLLING STARTUP OF MULTIPLE IDE_HDDS

(75) Inventor: Ming-Huan Yuan, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 487 days.

This patent is subject to a terminal disclaimer.

(21) Appl. No.: 10/335,319

(22) Filed: Dec. 30, 2002

(65) Prior Publication Data

US 2004/0025070 A1    Feb. 5, 2004

(30) Foreign Application Priority Data

Aug. 1, 2002    (TW) ............................... 91117350 A

(51) Int. Cl.
*G06F 1/26* (2006.01)
*G06F 1/28* (2006.01)

(52) U.S. Cl. ........................... 713/330; 710/8; 710/74; 710/114; 710/310; 711/114

(58) Field of Classification Search .................... 713/1, 713/2, 100, 300, 310, 320, 321, 322, 323, 713/324, 330, 340, 375, 400, 401, 500, 501, 713/502, 503, 600, 601
See application file for complete search history.

(56) References Cited

U.S. PATENT DOCUMENTS

| | | | | |
|---|---|---|---|---|
| 4,110,809 A | * | 8/1978 | Cronin | 361/95 |
| 5,721,840 A | * | 2/1998 | Soga | 710/310 |
| 6,016,518 A | * | 1/2000 | Matsushima et al. | 710/8 |
| 6,131,142 A | * | 10/2000 | Kamo et al. | 711/114 |
| 6,460,099 B1 | * | 10/2002 | Stryker et al. | 710/74 |
| 6,868,501 B1 | * | 3/2005 | Saitou et al. | 713/330 |

* cited by examiner

Primary Examiner—Lynne H. Browne
Assistant Examiner—Fahmida Rahman
(74) Attorney, Agent, or Firm—Wei Te Chung

(57) ABSTRACT

The present invention provides a method and a control apparatus (1) for sequentially controlling the spinning up of a number of IDE_HDDs (30) included in one computer or network server. The method and apparatus works by assigning different ID numbers to different pairs of IDE_HDDs and causing a delay between the start of spin up of each pair. The control apparatus includes a host (10), a plurality of controllers (20), a plurality of power switches (40) and a plurality of IDE_HDDs. When the control apparatus is booted up, each controller receives an ID number from the host and delays activating the power switches connecting a power supply (50) to the IDE_HDDs by a time proportional to the ID number. The present invention thereby avoids too high an instantaneous peak current during booting up and prevents the power supply from being burnt out.

8 Claims, 3 Drawing Sheets

METHOD AND CONTROL APPARATUS FOR CONTROLLING STARTUP OF MULTIPLE IDE_HDDS

BACKGROUND OF THE INVENTION

1. Field of the Invention

The present invention relates to startup of multiple IDE_HDDs in computer systems, and particularly to a method and control apparatus for controlling startup of multiple IDE_HDDs in a computer system.

2. Related Art

With computer technology advances, today's computer systems need a large memory capacity. Nonvolatile external memory devices with a large storage capacity are used to greatly increase memory capacity of a computer system. Currently, hard disk drives (HDDs) are one of the more popular external memory devices.

An HDD comprises a storage medium, e.g. a hard disk, a read/write head, a spindle motor that rotates the storage medium, and a circuit board. The circuit board includes a connector to connect the HDD to an interface board of a computer system. The Integrated Device Electronics (IDE) interface is a defacto standard interface for connecting HDDs to computer systems. An HDD that conforms to the IDE standard will be referred to as an "IDE_HDD". The IDE standard allows two HDDs to connect to a single interface board. When two HDDs are connected, one HDD serves as a master HDD while the other serves as a slave HDD.

When only two IDE_HDDs are installed in a computer system, as the system boots up, both IDE_HDDs spin up together. In an initial period, the peak current of each IDE_HDD can be up to 2A. When the system is up and running, the current falls to a lower mean value. The influence of the peak starting current on the power supply is normally not serious when there are only a few IDE_HDDs.

However, in systems needing a larger memory capacity, such as a network system, more IDE_HDDs are needed. Therefore, if eight IDE_HDDs are installed in the system, the peak starting current during boot-up can be up to 16A, since all the IDE_HDDs spin up together. A conventional power supply cannot endure so high a peak current and power consumption, and can easily burn out. A special power supply to supply the needed power increases the cost of the system.

Accordingly, a method and a corresponding control apparatus for controlling startup of a multiple IDE_HDD system are desired to overcome the above problems.

SUMMARY OF THE INVENTION

An object of the present invention is to provide a method and a control apparatus for controlling startup of multiple IDE_HDDs to reduce peak current drawn during boot-up of a computer, thereby protecting the computer's power supply from being burnt out, and lowering cost of the computer.

To achieve the above object, a method and a control apparatus in accordance with a preferred embodiment of the present invention can control multiple IDE_HDDs to sequentially spin up using different assigned ID numbers. The control apparatus includes a host, a plurality of controllers, a plurality of power switches and a plurality of IDE_HDDs. When the control apparatus is booted up, each controller receives an ID number from the host and actuates power switches controlled by it to turn on in a sequence based on the ID numbers. Therefore, a power supply powers up the IDE_HDDs connected to the power switches in a controlled sequence.

These and additional objects, features and advantages of the present invention will become apparent after reading the following detailed description of a preferred embodiment of the invention when taken in conjunction with the appended drawings.

DETAILED DESCRIPTION OF THE INVENTION

Figure 1:
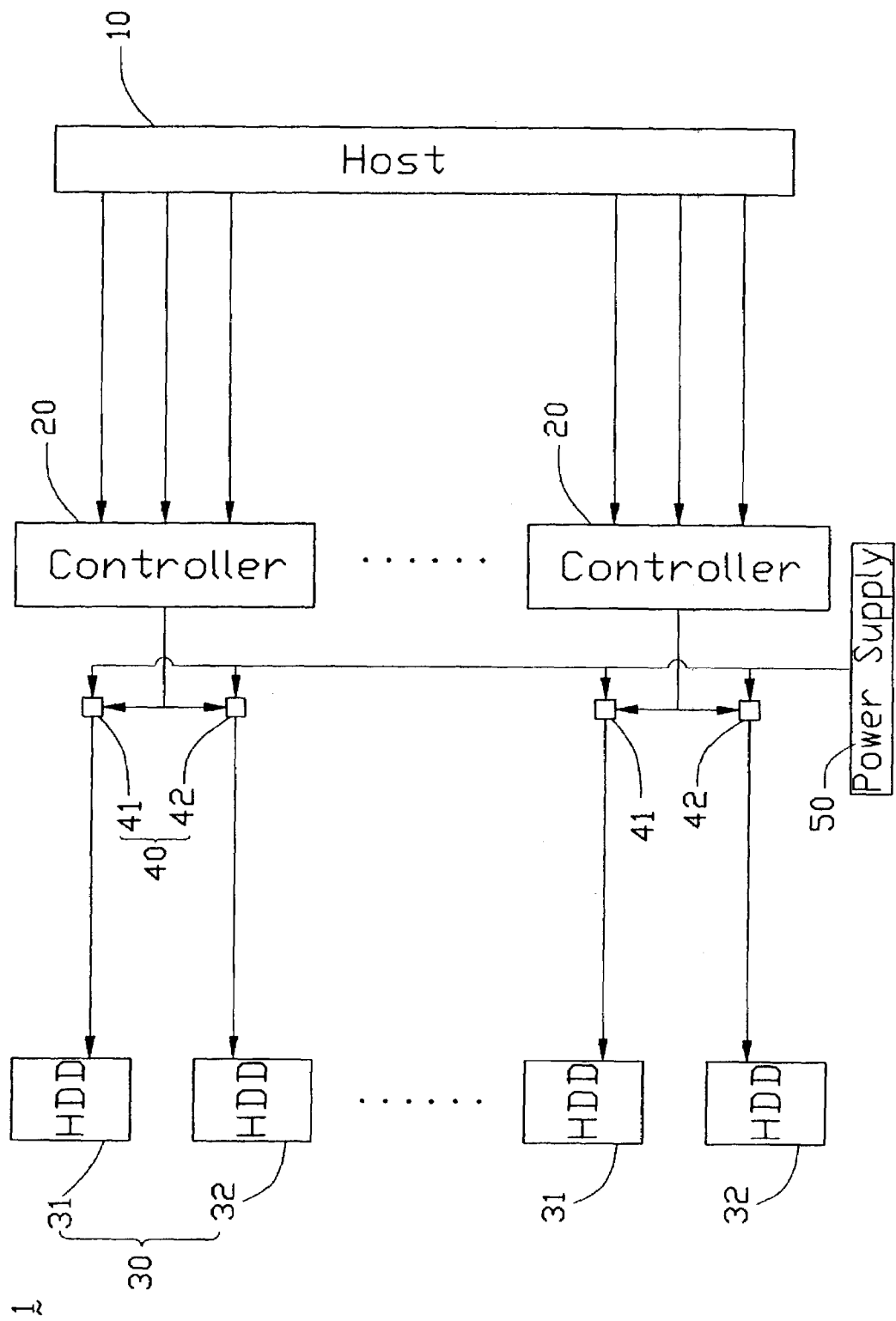
FIG. 1 is a block diagram of a control apparatus for controlling startup of multiple IDE_HDDs according to the present invention.

FIG. 1 is a block diagram of a control apparatus 1 for controlling startup of multiple IDE_HDDs in accordance with a preferred embodiment of the present invention. In this detailed description, the controlled IDE_HDDs will be considered as an integral component of the control apparatus 1. The control apparatus 1 represented includes a host 10, four controllers 20, four pairs of IDE_HDDs 30, four corresponding pairs of power switches 40, and a power supply 50. Each controller 20 controls a pair of IDE_HDDs 30 through a pair of power switches 40, thereby forming an IDE channel (not labeled). One of each pair of IDE_HDDs serves as a master IDE_HDD 31 and the other serves as a slave IDE_HDD 32. Altogether there are four IDE channels and the host 10 is normally set to designate each IDE channel with a different identification (ID) number. The power supply 50 supplies electrical power for the IDE_HDDs through the power switches 40.

Figure 2:
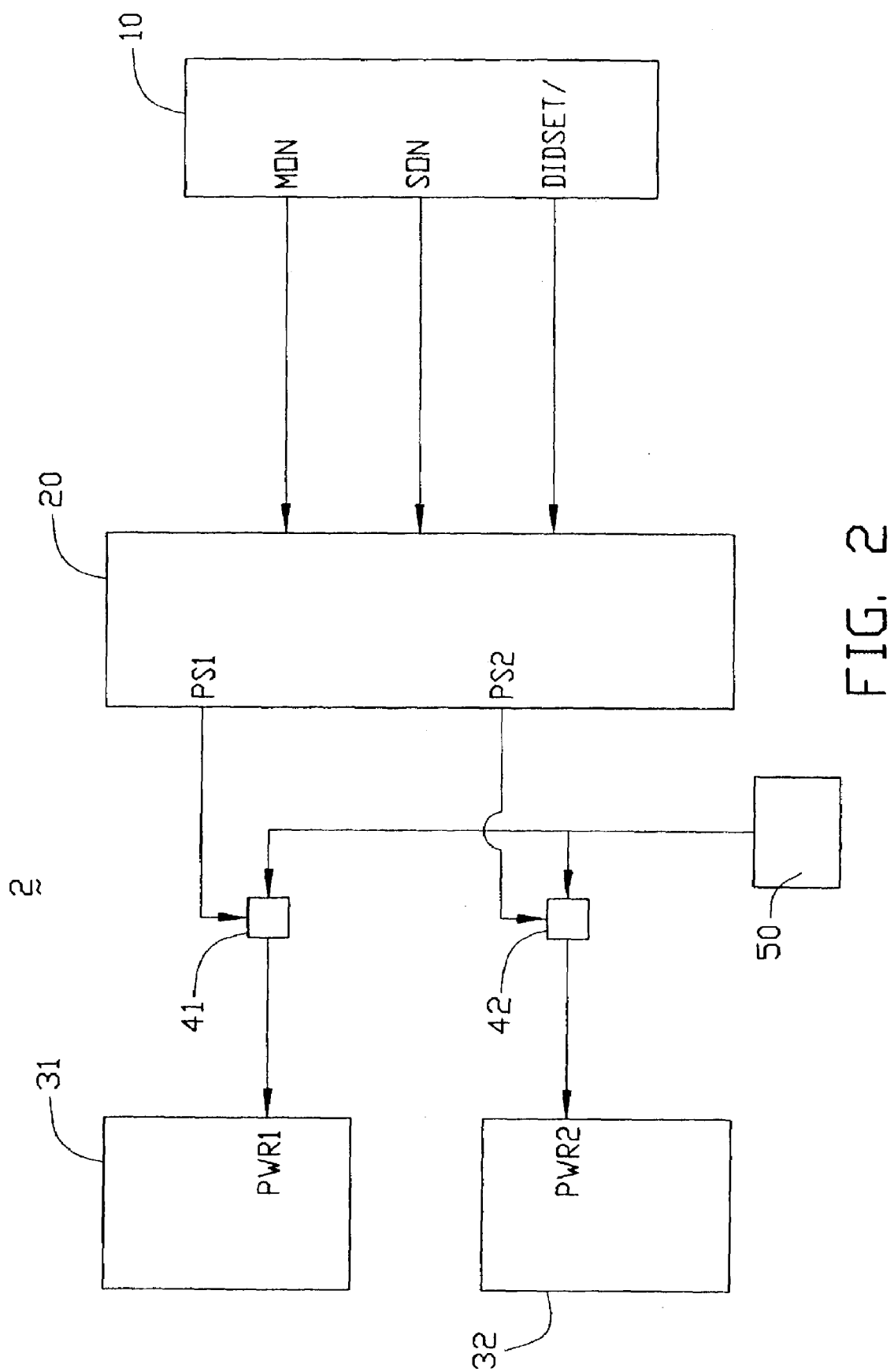
FIG. 2 is a block diagram of a subset of the control apparatus of FIG. 1, for controlling startup of a pair of IDE_HDDs.

FIG. 2 is a block diagram for a subset 2 of the control apparatus 1, showing more detail. Subset 2 includes an IDE channel and its connection to the host 10. Each subset 2 works in the same way. In the subset 2, the host 10 controls the corresponding pair of IDE_HDDs 30 through a corresponding controller 20.

The host 10 provides a plurality of pins to respectively couple to corresponding controllers 20 for exchange of information. The host 10 has ID indication pins MON and SON for each controller 20 to indicate the ID number of the corresponding IDE channel. The MON pin and the SON pin of each subset are separately set to a high level or to a low level by setting jumpers or by firmware. The settings of the MON pin and the SON pin designate an ID number of the corresponding IDE channel. The host 10 further provides an ID set pin, DIDSET/. In this embodiment when the DIDSET/ pin is in a low-level state, the host 10 commands the corresponding controller 20 to get the corresponding ID number from the host 10. In a like manner, the DIDSET/ pin can also be set in a high-level state to trigger the same response.

Each subset 2 further includes a first power switch 41 and a second power switch 42, which respectively connects/disconnects power to/from the master IDD_HDD 31 and the slave IDE_HDD 32. The controller 20 provides a PS1 pin and a PS2 pin. The PS1 pin and the PS2 pin couple to the first and the second power switches 41 and 42, respectively.

Control signals output from the PS1 and PS2 pins of the controller 20 are input to the first and the second power switches 41 and 42 for turning on or turning off the power switches 41 and 42. When the switches 41 and 42 are turned on, power from the power supply 50 is connected to the master and slave IDE_HDDs 31 and 32 through the first and the second power switches 41 and 42 into a PWR1 pin of the master IDE_HDD 31 and a PWR2 pin of the slave IDE_HDD 32.

Figure 3:
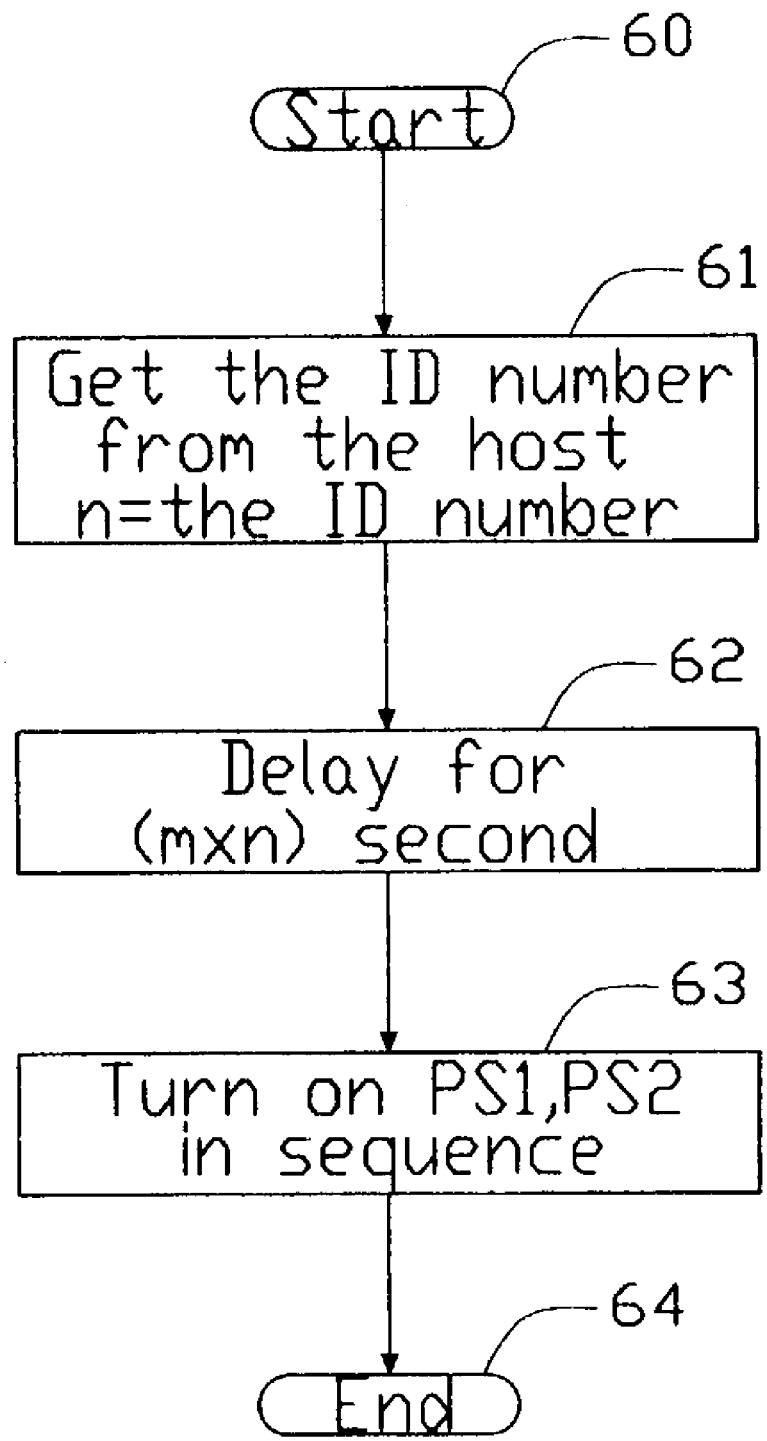
FIG. 3 is a flow diagram illustrating the startup steps of the channel of FIG. 2.

Referring to FIG. 3, a flow diagram shows the process steps performed by each subset 2 of FIG. 2. The process begins at step 60 with the booting up of the host 10 and the checking of the DIDSET/ pin level as being high or low. If the DIDSET/ pin is low, the process moves to step 61. At step 61, the controller 20 reads the ID number at the corresponding MON and SON ID indication pins of the host 10. The ID number is designated as n below. When the control apparatus 1 has four pairs of IDE_HDDs, namely, four IDE channels, numerical values of n correspond with the following readings at pins MON and SON:

| n | MON | SON |
|---|-----|-----|
| 0 | 0   | 0   |
| 1 | 0   | 1   |
| 2 | 1   | 0   |
| 3 | 1   | 1   | where "0" and "1" respectively represent the low and high voltage levels at the MON pin and the SON pin.

After reading the corresponding ID number "n" at step 61, the controller 20 delays m×n seconds at step 62. With four IDE channels, numerical values of n range from 0 to 3, and assuming values of DIDSET/ are read at the same time for all channels and that ID numbers of each different channel are different, the pairs of IDE_HDDs in a four IDE channel system are powered up in sequence at intervals of m seconds. Note that the master IDE_HDD 31 and the slave IDE_HDD 32 of a given pair of IDE_HDDs are not spun up at the same time since they are respectively designated as "master" or "slave" by the host 10. The master IDE_HDD 31 generally spins up first. After the delay mandated by step 62, the process moves to step 63, wherein the controller sequentially applies a voltage at the PS1 pin and the PS2 pin, which actuates the first and the second power switches 41 and 42 to connect the power supply 50 to the master and the slave IDE_HDDs 31 and 32, in the correct sequence.

In accordance with the steps of FIG. 3, the master and the slave IDE_HDDs 31 and 32 of each of the IDE channels are spun up in sequence, with each of the four pairs of IDE_HDDs of different channels being spun up at intervals of m seconds between the start of spinning up of one pair and the start of spinning up of the succeeding pair.

In comparison with the prior art, this present invention provides a method and a control apparatus for sequentially controlling spin up of a number of IDE_HDDs. The control scheme works by assigning different ID numbers to each pair of IDE_HDDs and causing a delay between the start of spin up of each pair of IDE_HDDs, thereby avoiding instantaneous peak currents so high that they can burn out the power supply 50.

Although the present invention has been described with reference to a specific embodiment thereof, the description is illustrative and is not to be construed as limiting the invention. Various modifications to the present invention may be made to the preferred embodiment by those skilled in the art without departing from the true spirit and scope of the invention as defined by the appended claims.

I claim:

1. A control apparatus for controlling startup of a plurality of peripheral devices in a computer system, comprising:
   a power supply for affording electrical power to the peripheral devices;
   a host electronic circuitry including a plurality of sets of identification (ID) indication pins and an identification (ID) set pin, each set of ID indication pins designating a unique whole ID number, the set of whole numbers being continuous from 0 to x, where x+1 is a whole number divisor of the total number of peripheral device controlled;
   a plurality of power switches each electrically connected between the power supply and a corresponding peripheral device of the plurality of peripheral devices, whereby the corresponding peripheral device can receive power transmitted through the power switch;
   and a plurality of controllers comprised of control circuitry, the controllers being electrically connected between the host and said corresponding power switches, each controller receiving a corresponding ID number of the set of whole numbers from the host;
   wherein the power switches are actuated to open and close according to control signals received from the corresponding controller such that the power switches connect the power supply to the peripheral devices in a sequence determined by the ID numbers assigned to the controllers, the plurality of peripheral devices are IDE_HDDs which are hard disk drives (HDDs) conforming to the Integrated Device Electronics IDE interface.

2. The control apparatus as claimed in claim 1, wherein when the ID set pin is in a low-level state, the host commands each controller to get the corresponding ID number from the host.

3. The control apparatus as claimed in claim 1, wherein the IDE_HDDs are assigned in pairs of IDE_HDDs and each controller controls a pair of IDE_HDDs through power switches.

4. The control apparatus as claimed in claim 3, wherein a controller of the plurality of controllers assigned the ID number denoted "n" delays m×n seconds from receipt of the ID number to a time of actuating a switch to close to connect the power supply to an IDE_HDD of the IDE_HDDs connected thereto, wherein m is a present interval period.

5. The control apparatus as claimed in claim 3, wherein each pair of IDE_HDDs includes a master IDE_HDD and a slave IDE_HDD and the two IDE_HDDs are started up with an interval between their respective times of starting up.

6. A method for controlling connection of power to a plurality of peripheral devices using a control apparatus having a host electronic circuitry, a plurality of controller electronic circuitries and a plurality of power switches, the power switches arranged in pairs of power switches, said peripheral devices being IDE_HDDs which are hard disk drives (HDDs) conforming to the Integrated Device Electronics (IDE) interface, the IDE_HDDs arranged in pairs of IDE_HDDs and each controller controls a pair of IDE_HDDs through a pair of power switches, the method comprising the steps of:

(1) transmitting an identification (ID) number from the host to each controller, checking an ID set pin of the host which can selectively alternate between a "low"

and a "high" voltage level and transmitting the ID number only if the ID set pin voltage level is "low";

(2) delaying actuation of each power switch for m.times.n seconds where n is the ID number received by the controller connected to the power switch so that the peripheral devices are connected to the power after an interval of m.times.n seconds, wherein m is a present interval period;

(3) actuating the power switch to close, thereby transmitting power to the peripheral devices.

7. The method as claimed in claim 6, wherein the peripheral devices are assigned in pairs of peripheral devices, and different pairs of peripheral devices are connected to power with an interval of m seconds between a start of connection of each pair.

8. The method as claimed in claim 6, wherein the power is supplied by a power supply in the computer.

* * * * *